United States Patent [19]
Hutchinson

[11] Patent Number: 6,085,503
[45] Date of Patent: Jul. 11, 2000

[54] TRIMMING DEVICE CARRIAGE SYSTEM

[76] Inventor: James C. Hutchinson, 3494 Griffitt Bend Rd., Talladega, Ala. 35160

[21] Appl. No.: 09/282,290

[22] Filed: Mar. 31, 1999

[51] Int. Cl.[7] .................................................. A01D 34/46
[52] U.S. Cl. ............................ 56/12.7; 56/16.7; 56/17.2; 280/47.24; D34/24; 248/230.1
[58] Field of Search .................................. 56/12.1, 16.7, 56/17.2, 17.5, 12.7; 30/276; D34/24, 12, 27; 280/47.24; 248/230.1, 230.9

[56] References Cited

U.S. PATENT DOCUMENTS

| | | | |
|---|---|---|---|
| D. 342,361 | 12/1993 | Williams et al. | D34/24 |
| D. 402,433 | 12/1998 | Wells | D34/24 |
| 4,182,100 | 1/1980 | Letter | 56/16.7 |
| 4,829,755 | 5/1989 | Nance | 56/17.5 X |
| 4,922,694 | 5/1990 | Emoto | 56/16.7 |
| 5,092,112 | 3/1992 | Buckendorf, Jr. | 56/17.5 |
| 5,279,102 | 1/1994 | Foster | 56/17.2 X |

*Primary Examiner*—H. Shackelford

[57] ABSTRACT

A trimming device carriage system for allowing a user to conveniently utilize a conventional trimming device without requiring significant effort by the user. The inventive device includes a support structure secured to a second base, a pair of handles secured to a first base, and a pair of brackets attached to each of the first base and the second base for removably engaging a trimmer shaft of a conventional trimmer. The support structure comprises a pair of upper legs secured to the second base and slidably positioned within a corresponding pair of lower legs. A plurality of adjustment apertures within the upper legs catchably receive a detent springably attached to the pair of lower legs. The upper legs are pivotally attached to the second base by a pair of second wing fasteners. The pair of handles are pivotally attached to the first base by a pair of first wing fasteners thereby allowing adjustment of the angle of the handles. The first base and the second base may be attached to one another through an interlocking first L-portion and second L-portion wherein a conventional fastener secures the L-portions.

6 Claims, 5 Drawing Sheets

TRIMMING DEVICE CARRIAGE SYSTEM

BACKGROUND OF THE INVENTION

1. Field of the Invention

The present invention relates generally to trimming devices and more specifically it relates to a trimming device carriage system for allowing a user to conveniently utilize a conventional trimming device without requiring significant effort by the user.

2. Description of the Prior Art

Trimming devices have been in use for years. Typically, a conventional trimming device comprises an elongated handle, a motor attached to the lower end of the handle, and a cutting system mechanically connected to the motor. In operation the user positions the cutting system near the grass or other plants to be trimmed. The user must "balance" the weight of the motor and cutting system by manipulating the elongated handle.

Balancing the conventional trimming device can be extremely tiresome over a period of time. In addition, elderly individuals find it difficult to operate conventional trimming devices over even a short period of time. When utilizing the conventional trimming device upon sloped land it is extremely difficult to balance and maintain a steady position of the conventional trimming device.

While conventional trimming devices may be suitable for the particular purpose to which they address, they are not as suitable for allowing a user to conveniently utilize a conventional trimming device without requiring significant effort by the user. Conventional trimming devices require significant strength by the user.

In these respects, the trimming device carriage system according to the present invention substantially departs from the conventional concepts and designs of the prior art, and in so doing provides an apparatus primarily developed for the purpose of allowing a user to conveniently utilize a conventional trimming device without requiring significant effort by the user.

SUMMARY OF THE INVENTION

In view of the foregoing disadvantages inherent in the known types of trimming devices now present in the prior art, the present invention provides a new trimming device carriage system construction wherein the same can be utilized for allowing a user to conveniently utilize a conventional trimming device without requiring significant effort by the user.

The general purpose of the present invention, which will be described subsequently in greater detail, is to provide a new trimming device carriage system that has many of the advantages of the trimming devices mentioned heretofore and many novel features that result in a new trimming device carriage system which is not anticipated, rendered obvious, suggested, or even implied by any of the prior art trimming devices, either alone or in any combination thereof.

To attain this, the present invention generally comprises a support structure secured to a second base, a pair of handles secured to a first base, and a pair of brackets attached to each of the first base and the second base for removably engaging a trimmer shaft of a conventional trimmer. The support structure comprises a pair of upper legs secured to the second base and slidably positioned within a corresponding pair of lower legs. A plurality of adjustment apertures within the upper legs catchably receive a detent springably attached to the pair of lower legs. The upper legs are pivotally attached to the second base by a pair of second wing fasteners. The pair of handles are pivotally attached to the first base by a pair of first wing fasteners thereby allowing adjustment of the angle of the handles. The first base and the second base may be attached to one another through an interlocking first L-portion and second L-portion wherein a conventional fastener secures the L-portions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a trimming device carriage system that will overcome the shortcomings of the prior art devices.

Another object is to provide a trimming device carriage system that allows a user to easily utilize a conventional trimming device.

An additional object is to provide a trimming device carriage system that is removably attachable to a conventional trimming device.

A further object is to provide a trimming device carriage system that is adjustable in height and angle of supporting the conventional trimming device.

Another object is to provide a trimming device carriage system that maintains the cutting plane substantially parallel to the ground surface.

An additional object is to provide a trimming device carriage system that attaches to various diameter of trimmer shafts.

An additional object is to provide a trimming device carriage system that supports various designs of trimmer devices.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
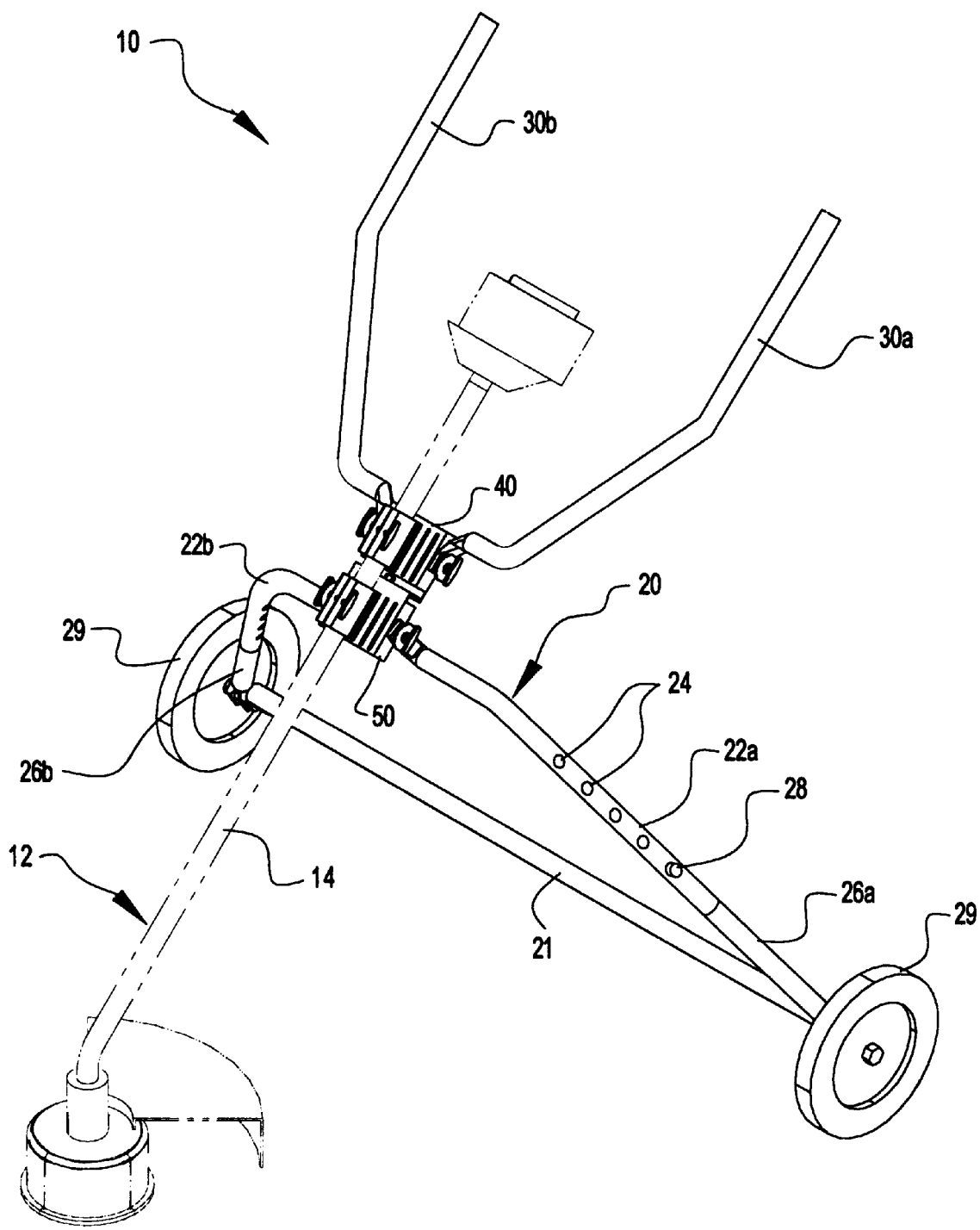
FIG. 1 is an upper perspective view of the present invention attached to the trimmer shaft of a conventional trimmer.

Turning now descriptively to the drawings, in which similar reference characters denote similar elements throughout the several view, FIGS. 1 through 5 illustrate a trimming device carriage system 10, which comprises a support structure 20 secured to a second base 50, a pair of handles 30a–b secured to a first base 40, and a pair of brackets 60 attached to each of the first base 40 and the second base 50 for removably engaging a trimmer shaft 14 of a conventional trimmer 12. The support structure 20 comprises a pair of upper legs 22a–b secured to the second base 50 and slidably positioned within a corresponding pair of lower legs 26a–b. A plurality of adjustment apertures 24 within the upper legs 22a–b catchably receive a pair of detents 28 springably attached to the pair of lower legs 26a–b. The upper legs 22a–b are pivotally attached to the second base 50 by a pair of second wing fasteners 52. The pair of handles 30a–b are pivotally attached to the first base 40 by a pair of first wing fasteners 42 thereby allowing adjustment of the angle of the handles 30a–b. The first base 40 and the second base 50 may be attached to one another through an interlocking first L-portion 46 and second L-portion 56 wherein a conventional fastener 48 secures the L-portions.

Figure 2:
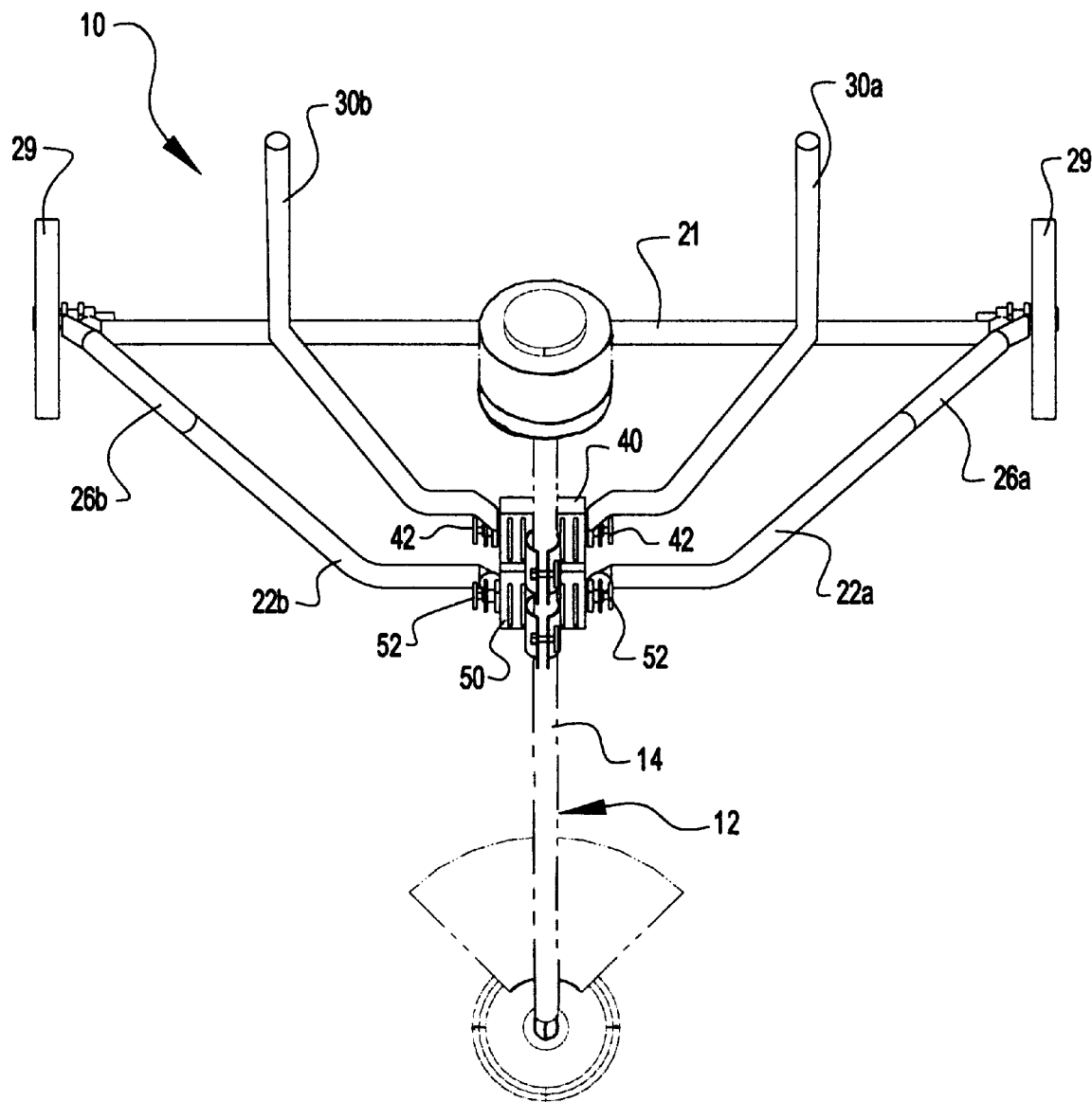
FIG. 2 is a top view of the present invention.

As shown in FIGS. 1 and 2 of the drawings, the support structure 20 comprises a pair of upper legs 22a–b and a pair of corresponding lower legs 26a–b. The lower legs 26a–b are preferably slidably positioned within the pair of upper legs 22a–b for allowing adjustment of the height of the conventional trimmer 12. The pair of upper legs 22a–b include a plurality of adjustment apertures 24 that removably receive a pair of detents 28 that are springably connected to the inner legs.

Figure 3:
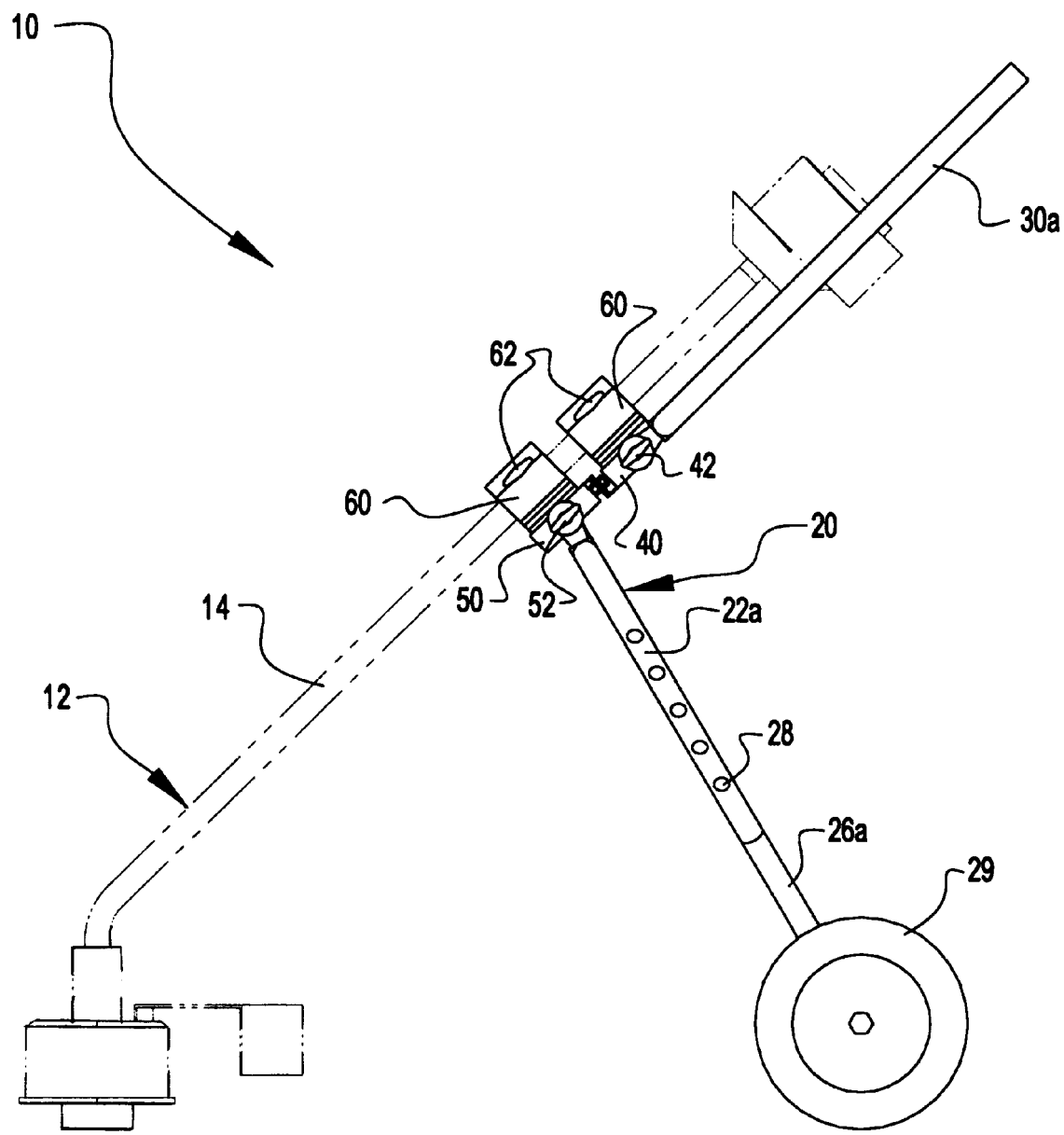
FIG. 3 is a side view of the present invention.

A cross member 21 is secured between the lower ends of the lower legs 26a–b as best shown in FIG. 2 of the drawings. A pair of wheels 29 are rotatably attached to the lower ends of the pair of lower legs 26a–b as shown in FIGS. 1 through 3 of the drawings.

The upper legs 22a–b are pivotally attached to a second base 50 as shown in FIGS. 1 through 5 of the drawings. The upper legs 22a–b are pivotally attached to the second base 50 by a pair of second wing fasteners 52 that can be manually tightened and loosened thereby allowing adjustment of the angle of the upper legs 22a–b with respect to the second base 50.

A pair of handles 30a–b are pivotally attached to a first base 40 as shown in FIGS. 1 through 5 of the drawings. The handles 30a–b are pivotally attached to the first base 40 by a pair of first wing fasteners 42 that can be manually tightened and loosened thereby allowing adjustment of the angle of the handles 30a–b with respect to the first base 40.

Figure 4:
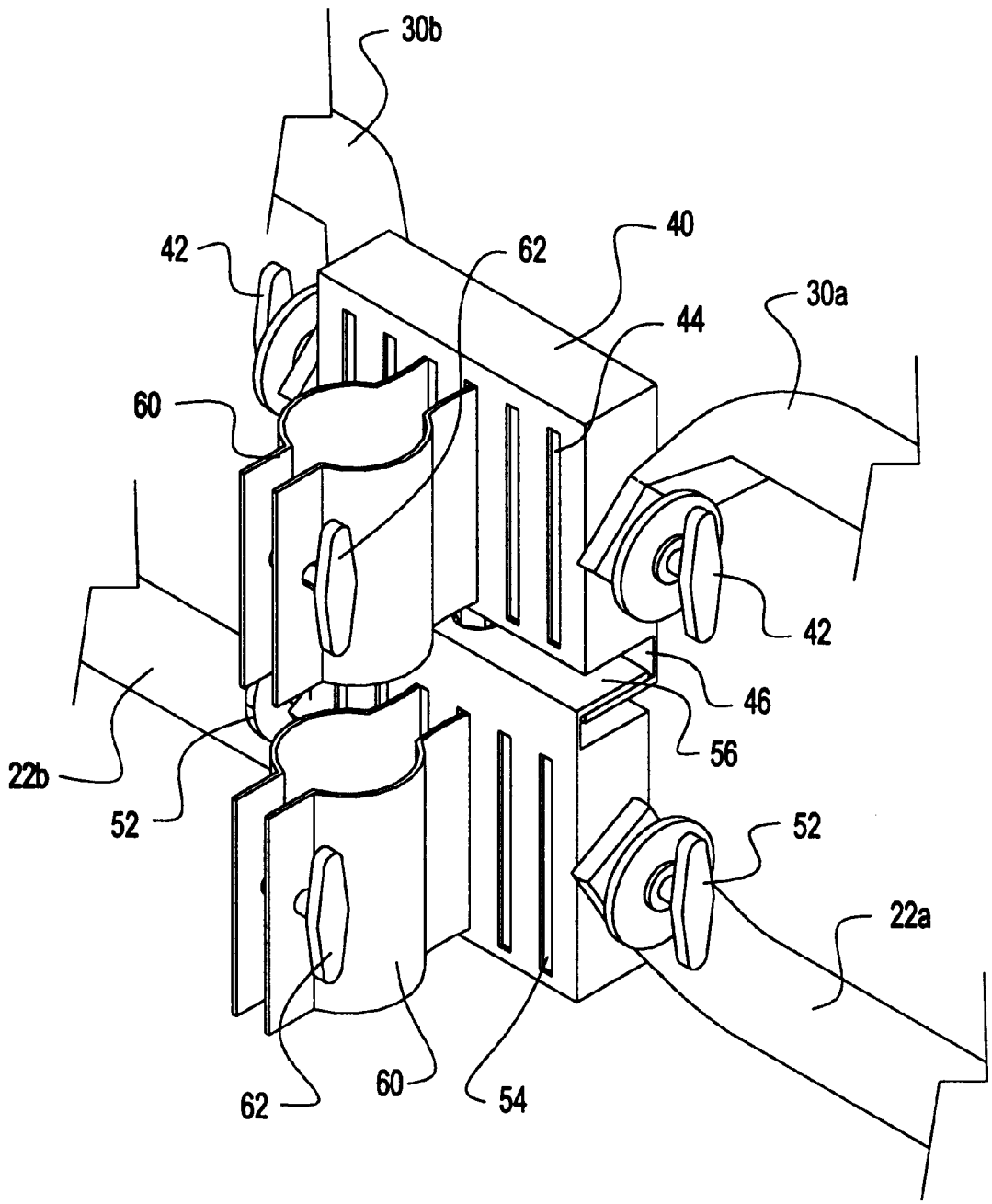
FIG. 4 is a magnified upper perspective view of the attachment structure.

As best shown in FIG. 4 of the drawings, the first base 40 includes a plurality of first slots 44 parallel to one another. The plurality of first slots 44 removably receive a pair of brackets 60 as further shown in FIG. 4 of the drawings for allowing attachment to any diameter of trimmer shaft 14. The brackets 60 are substantially C-shaped with the lower portion having a lip that removably engages the first base 40 within one of the first slots 44. A bracket wing fastener 62 is threadably attached between the pair of brackets 60 that are positioned within the first base 40 for allowing tightening upon the trimmer shaft 14 of the conventional trimmer 12. The first base 40 also includes a first L-portion 46 as best shown in FIGS. 4 and 5 of the drawings.

As best shown in FIG. 4 of the drawings, the second base 50 includes a plurality of second slots 54 parallel to one another. The plurality of second slots 54 removably receive a pair of brackets 60 as further shown in FIG. 4 of the drawings for allowing attachment to any diameter of trimmer shaft 14. The brackets 60 are substantially C-shaped with the lower portion having a lip that removably engages the second base 50 within one of the second slots 54. A bracket wing fastener 62 is threadably attached between the pair of brackets 60 that are positioned within the second base 50 for allowing tightening upon the trimmer shaft 14 of the conventional trimmer 12. The second base 50 also includes a second L-portion 56 as best shown in FIGS. 4 and 5 of the drawings.

Figure 5:
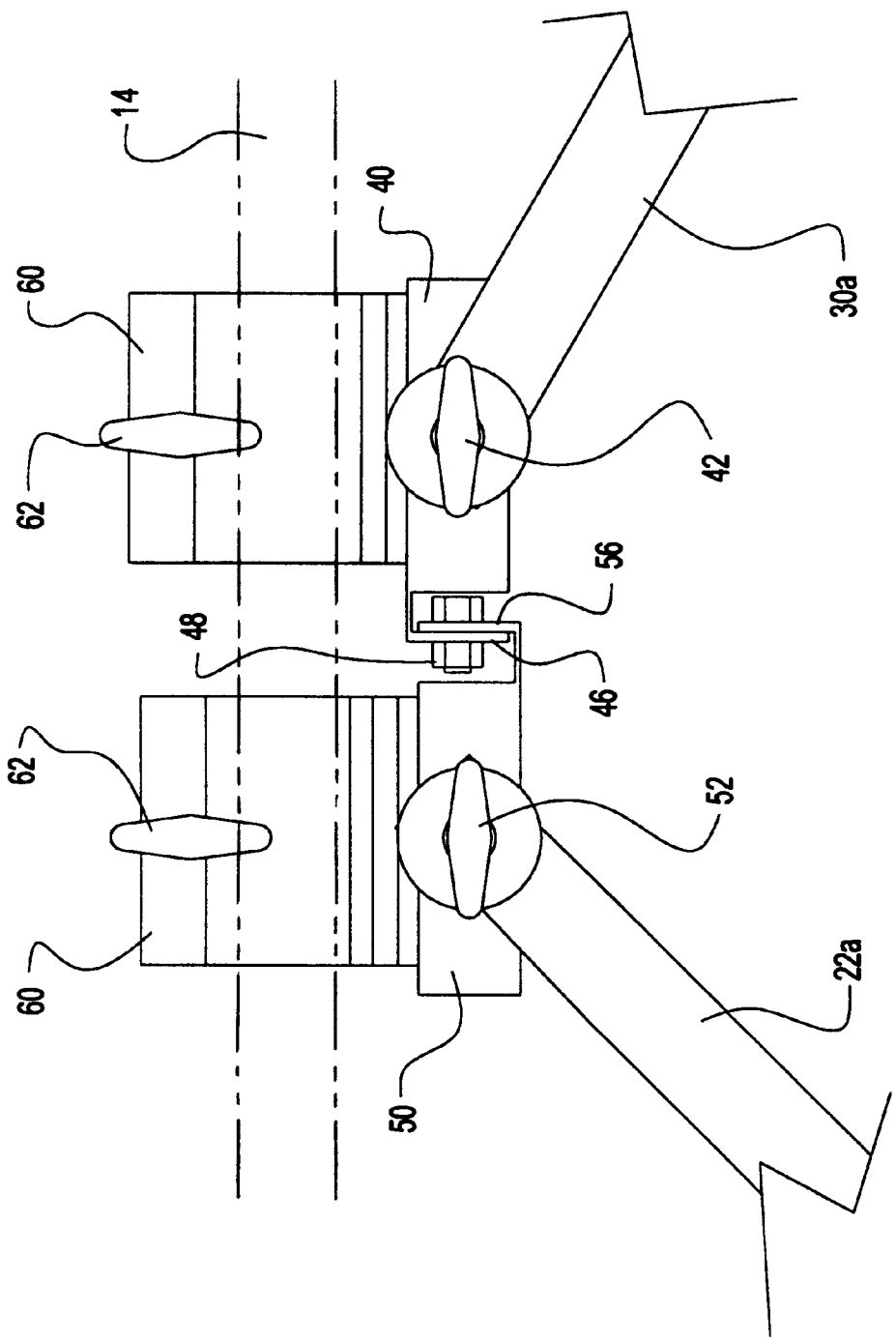
FIG. 5 is a magnified side view of the attachment structure secured about a trimmer shaft.

The second L-portion 56 removably mates with the first L-portion 46 as best shown in FIG. 5 of the drawings for interlocking the second base 50 and the first base 40. A conventional faster is secured between the first L-portion 46 and the second L-portion 56 thereby connecting the L-portions 46, 56.

In use, the user removes the bracket wing fastener 62 from each of the brackets 60 attached to the first base 40 and second base 50. The user positions the brackets 60 within the slots 44, 54 so that they accept the diameter of the trimmer shaft 14. The user positions the trimmer shaft 14 within the bracket and then secures the bracket wing fastener 62 to tighten the brackets 60 about the trimmer shaft 14 in the desired position. If the user will be utilizing the conventional trimmer 12 going downhill, the user will position the brackets 60 closer to the cutting system of the conventional trimmer 12 and will lower the upper legs 22a–b about the lower legs 26a–b. If the user will be utilizing the conventional trimmer 12 going uphill, the user will position the brackets 60 closer to the handle of the conventional trimmer 12 and will raise the upper legs 22a–b about the lower legs 26a–b. The user then adjusts the position of the handles 30a–b depending upon their height and the terrain to trim grass upon. The user then starts the conventional trimmer 12 and then grasps the handles 30a–b for manipulating the cutting system of the conventional trimmer 12 to the desired areas to be trimmed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Trimming Device Carriage System
ENVIRONMENTAL ELEMENTS
10. Trimming Device Carriage System
11.
12. Conventional Trimmer
13.
14. Trimmer Shaft
15.
16.
17.
18.
19.
20. Support Structure
21. Cross Member
22. Upper Legs (a–b)
23.
24 Adjustment Apertures
25.
26. Lower Legs (a–b)
27.
28. Detents
29. Wheels
30. Handles (a–b)
31.
32.
33.
34.
35.
36.
37.
38.
39.
40. First Base
41.
42. First Wing Fastener
43.
44. First Slots
45.
46. First L-Portion
47.
48. Conventional Fastener
49.
50. Second Base
51.
52. Second Wing Fasteners
53.
54. Second Slots
55.
56. Second L-Portion
57.
58.
59.
60. Brackets
61.
62. Bracket Wing Fastener
63.
64.
65.
66.
67
68.
69.
70.
71.
72.
73.
74.
75.
76.
77.
78.
79.

I claim:

1. A trimming device carriage system, comprising:

a support structure having at least two wheels;

a first securing means attached to said support structure for removably engaging a trimmer shaft of a trimmer;

a handle structure; and a second securing means attached to said handle structure for removably engaging said trimmer shaft of said trimmer;

wherein said handle structure is adjustably attachable to said trimmer shaft for various heights of users;

wherein said support structure is adjustable in height;

wherein said support structure is adjustably attachable to said trimmer shaft along a longitudinal axis of said trimmer shaft;

wherein said support structure comprises:
a pair of lower legs attached to said at least two wheels;
a pair of upper legs slidably connected to said pair of lower legs; and
a locking means for selectively locking the position of said pair of upper legs with said pair of lower legs;

wherein said locking means comprises:
a plurality of apertures within said pair of upper legs; and
a pair of detents attached to said pair of lower legs for selectively engaging said apertures;

wherein said support structure includes a cross member between said lower legs;

wherein said first securing means and second securing means each comprise:
a base;
a plurality of slots within said base that receive a pair of brackets that surround said trimmer shaft; and
a bracket wing fastener threadably engaged within said pair of brackets for tightening against said trimmer shaft.

2. The trimming device carriage system of claim 1, wherein said base includes an L-portion thereby allowing connection of said first securing means to said second securing means.

3. The trimming device carriage system of claim 2, including a fastener for securing said L-portion of said first securing means to said second securing means.

4. The trimming device carriage system, comprising:

a support structure having at least two wheels;

a first securing means pivotally attached to said support structure for removably engaging a trimmer shaft of a trimmer, wherein said first securing means allows said support structure to be locked into a desired position with respect to said trimmer shaft;

a handle structure; and a second securing means pivotally attached to said handle structure for removably engaging said trimmer shaft of said trimmer, wherein said first securing means allows said support structure to be locked into a desired position with respect to said trimmer shaft;

wherein said handle structure is adjustably attachable to said trimmer shaft for various heights of users;

wherein said support structure is adjustable in height;

wherein said support structure is adjustably attachable to said trimmer shaft along a longitudinal axis of said trimmer shaft;

wherein said support structure comprises:
- a pair of lower legs attached to said at least two wheels;
- a pair of upper legs slidably connected to said pair of lower legs; and
- a locking means for selectively locking the position of said pair of upper legs with said pair of lower legs;

wherein said locking means comprises:
- a plurality of apertures within said pair of upper legs; and
- a pair of detents attached to said pair of lower legs for selectively engaging said apertures;

wherein said support structure includes a cross member between said lower legs;

wherein said first securing means and second securing means each comprise:
- a base;
- a plurality of slots within said base that receive a pair of brackets that surround said trimmer shaft; and
- a bracket wing fastener threadably engaged within said pair of brackets for tightening against said trimmer shaft.

5. The trimming device carriage system of claim 4, wherein said base includes an L-portion thereby allowing connection of said first securing means to said second securing means.

6. The trimming device carriage system of claim 5, including a fastener for securing said L-portion of said first securing means to said second securing means.

* * * * *